Patented Dec. 5, 1944

2,364,593

UNITED STATES PATENT OFFICE 2,364,593

N,N'-DIARYLAMIDINES

Jack T. Thurston, Riverside, and Daniel E. Nagy, Stamford, Conn., assignors to American Cyanamid Company, New York, N. Y., a corporation of Maine No Drawing. Application September 8, 1943, Serial No. 501,562

7 Claims. (Cl. 260—564)

This invention relates to a new method of preparing N,N'-diarylamidines.

Although some of the N,N'-diarylamidines whose preparation is described herein are new compounds, these amidines are, as a class, broadly old. Known processes of preparing N,N'-diarylamidines have required the use of such reagents as phosphorus halides or anhydrous HCl. In addition to the obvious disadvantages of using such reagents, the processes employing them have not been entirely satisfactory because of low yields, the necessity for working at high or at very low temperatures, and the chemical disintegration of the reactants and/or product by these reagents. Because of this latter fact, the previously known methods of preparing N,N'-diarylamidines were not suitable for the preparation of the more complex amidines. Our process, on the other hand, gives good yields of N,N'-diarylamidines at moderate temperatures in a comparatively short length of time, using cheap, readily available and easily handled reagents. Our process is also particularly advantageous in being suitable for the preparation of many different types and kinds of N,N'-diarylamidines including those complex amidines which can not be prepared by previously described methods.

The N,N'-diarylamidines which may be prepared by our process have the general formula:

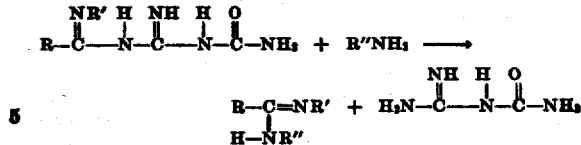

in which R may be an aliphatic, aromatic or alicyclic group, which may contain nitrogen, oxygen and sulfur linkages as well as substituents of various types and kinds, and R' and R" may be the same aryl radicals. R, R' and R" may have various substituent groups such as, —CONH$_2$, —COOH, —CO, —SO$_2$NH$_2$, —OR, —NR$_2$, —NO$_2$, —SO$_3$H, halogen, alkyl, aryl, etc.

The above N,N'-diarylamidines are prepared by our new process by reacting an acyl dicyandiamide with a primary aryl amine in the presence of an acid having a dissociation constant of at least 1×10$^{-5}$. Although we have not definitely determined how N,N'-diarylamidines are formed by our process it appears most likely, at present, that the following reactions are involved.

 + R'NH$_2$ ⟶

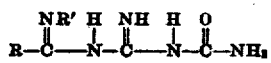—NH$_2$

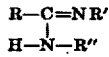—NH$_2$ + R"NH$_2$ ⟶

R—C=NR' + H$_2$N—C—N—C—NH$_2$
  |        NH  H  O
  H—NR"

In support of this, we have isolated and identified the product of the first equation. Since it is possible that other unknown intermediate reactions may take place, however, we do not wish to be bound by any theory or supposed course of reaction. Many of the compounds prepared by our process have been compared with known N,N'-diarylamidines prepared by other processes and it has been established as a fact that our reaction results in the formation of N,N'-diarylamidines. Chemical analysis and other chemical and physical properties have proven others to be as described.

We have found that any primary aromatic amine may be reacted with an acyl dicyandiamide in accordance with the above equation to yield N,N'-diarylamidines. The aryl group may have a wide variety of substituents attached thereto as stated above and as shown in the specific examples which follow. Representative of such primary aryl amines are aniline, toluidine, phentidine, sulfanilamide, p-phenylenediamine, α-naphthylamine, p-aminoacetanilide, sulfanilic acid, 4-amino-1,3,5-dimethylaniline, p-bromaniline, etc. Of course, the acid salts of these amines may also be employed.

The acyl dicyandiamides employed by us may be prepared by mixing an acylating agent such as an acyl halide or acid anhydride with dicyandiamide, water, acetone, and an alkali-metal hydroxide and allowing the mixture to react at temperatures not in excess of about 60° C. until an acyl dicyandiamide is formed. The preparation of representative acyl dicyandiamide is specifically described in some of the examples which follow. Among the various acyl dicyandiamides which may be employed by us to prepare N,N'-diarylamidines are benzoyldicyandiamide, acetyldicyandiamide, caproyldicyandiamide, lauroyldicyandiamide, sebacyl-bis-dicyandiamide, adipyl-bis-dicyandiamide, p-nitrobenzoyldicyandiamide, ω-carboxypropionyldicyandiamide, o-carboxybenzoyldicyandiamide, p-hydroxybenzoyldicyandiamide, β-ethoxypropionyldicyandiamide, naphthenyldicyandiamide, hexahydrotolyldicyandiamide, α-bromocaproyldicyandiamide, 9-10-dichlorostearyldicyandiamide, β-butylaminopropionyldicyandiamide, and others.

As stated before, any acid, either organic or inorganic, having a dissociation constant of at least $1 \times 10^{-5}$ may be employed by us in our reaction. Among such acids are hydrochloric, sulfuric, sulfurous, nitric, phosphoric, sulfanilic, valeric, acetic, benzoic, α-chlorpropionic, formic and others. Acid salts such as aniline hydrochloride, α-naphthylamine sulfate, etc. may also be used if desired.

The reaction is ordinarily carried out in the presence of a solvent to facilitate contact of the reagents and simplify the recovery of the product. Any inert solvent such as water, alcohol, acetone, dioxane, monoethyl ether of ethylene glycol and the like may be used alone or in admixture. It is not necessary that water be present in the reaction mixture. The amount of solvent is not critical, enough being used to dissolve the reactants and allow easy separation of the reaction product.

Although the reaction will, in some cases, take place at room temperature, particularly after a long period of time, the reaction is best conducted at elevated temperatures of from about 50° to 110° C., or more. The reaction is normally complete within 15 minutes to 2 or 3 hours, the time depending upon both the temperature of the reaction mixture and the particular reagents employed.

Most of the N,N'-diarylamidines are insoluble in alkaline solution and they may be readily separated from the reaction mixture by suspending the latter in water, and then adding an alkali, such as sodium hydroxide, potassium hydroxide, etc. to the solution to precipitate the N,N'-diarylamidine. This procedure is advantageous in that guanides which are sometimes formed in small amounts as side reaction products are soluble in alkaline solutions and may be separated from the amidine in this way. Of course, if the product is not required to have an exceptionally high purity, these purification steps may be omitted.

The proportions of reactants may vary rather widely. For each mole of the primary aromatic amine, we may use from about one-half to two moles of acid and one-half to two moles, or more, of the acyl dicyandiamide. However, there appears to be no particular reason for using a larger excess of any of the reactants beyond that required by the reaction equations given above.

Our invention will now be illustrated in greater detail by means of the following examples. It should be understood that these examples are merely illustrative and are not to be construed as limiting our invention to the particular reactants, proportions and reaction conditions described. N,N'-diarylamidines, other than those specifically described, have been prepared by us in good yields under conditions differing from those specifically set forth in these examples but falling within the scope of our invention as described hereinabove.

EXAMPLE 1

*N,N'-diphenylbutyramidine*

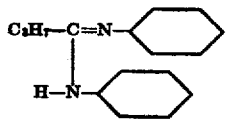

To a solution composed of 290 g. (3.5 moles) of dicyandiamide, 560 cc. of 50% NaOH solution (7.0 moles), 100 cc. of water and 500 cc. of acetone was added slowly at 5° C., 240 g. (2.26 moles) of butyryl chloride. After further stirring for a few minutes, the reaction mixture was acidified to a pH of about 5.5 with acetic acid whereupon butyryldicyandiamide was precipitated from solution. The product was filtered, washed with cold water and air dried.

10.2 g. (0.11 mole) of aniline and 8.5 cc. of concentrated hydrochloric acid (0.1 mole) were dissolved in 15 cc. of methanol and the solution heated approximately 75° C. To the heated solution there was added, with stirring, over a period of 0.5 to 1 hour, 7.7 g. (0.05 mole) of butyryldicyandiamide. The heating was then continued for 15 minutes after which the solution was cooled, filtered, diluted with water and made alkaline. A gum-like material which precipitated when the solution was made alkaline was N,N'-diphenylbutyramidine. This product was further purified by dissolving it in dilute HCl, adding decolorizing charcoal to the solution, filtering, and making the filtrate strongly alkaline with NaOH while stirring in an ice bath. The amidine separated as a gum-like material which gradually solidified on continued stirring. N,N'-diphenylbutyramidine is prepared by this process in good yields. The amidine is soluble in acetone and dilute HCl and has a melting point of 106–108° C.

EXAMPLE 2

The above experiment was repeated using one-half molecular portion of HCl. The N,N'-diphenylbutyramidine was obtained as before in practically the same yield.

EXAMPLE 3

The process of Example 1 was repeated using 0.1 mole of acetic acid in place of HCl. N,N'-diphenylbutyramidine was prepared by this process with fair yields.

EXAMPLE 4

A solution of 9.3 g. of aniline and 4.3 cc. of concentrated hydrochloric acid in 10 cc. of water and 10 cc. of acetone was prepared and heated to approximately 65° C. To the heated solution there was added slowly 7.7 g. of butyryldicyandiamide. After heating the reaction mixture for 55 minutes, the solution was cooled, filtered, diluted with water and made alkaline. N,N'-diphenylbutyramidine precipitated. The amidine was further purified as described in Example 1 and eventually recovered in a yield of 67% of theoretical.

EXAMPLE 5

A solution of 4.7 g. of aniline and 2.2 cc. of concentrated hydrochloric acid in 15 cc. of dioxane was heated to about 63° C. To this heated solution there was added 7.7 g. of butyryldicyandiamide in small portions over a period of from 0.5 to 1 hour. After the reaction mixture had been heated for 90 minutes, it was cooled, filtered, diluted with water and made alkaline as in the preceding examples. N,N'-diphenylbutyramidine was recovered as before in a yield of 74% based on the amount of aniline used.

EXAMPLE 6

A mixture composed of 4.7 g. of aniline, 7.2 g. of aniline hydrochloride and 30 cc. of dioxane was heated to 68° C. and 7.7 g. of butyryldicyandiamide added slowly thereto. After heating the reaction mixture for 25 minutes at 68° C., the solution was cooled, filtered, diluted with water and made alkaline. The precipitated N,N'-diphenylbutyramidine was obtained in a yield of 46% of theoretical.

EXAMPLE 7

A solution of 9.3 g. of aniline, 8.65 g. of 85% phosphoric acid, 20 cc. of acetone and 15 cc. of water was heated to its refluxing temperature. To this solution was added over a period of from 0.5 to 1 hour 7.7 g. of butyryldicyandiamide. Heating was continued for 2 hours, after which the solution was cooled, filtered, diluted with water and made alkaline. N,N'-diphenylbutyramidine was obtained in fair yields.

EXAMPLE 8

N,N'-diphenylvaleramidine

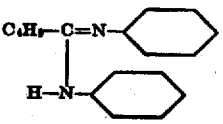

A mixture of 100 g. of dicyandiamide, 214 cc. of 60% potassium hydroxide and 300 cc. of acetone was prepared and cooled to 5° C. 92.9 g. of valeryl chloride was added to the solution slowly with stirring. The reaction mixture was then carefully acidified to a pH of about 5.5 whereupon valeryldicyandiamide was precipitated. The product was filtered, washed with cold water and air dried.

To a solution of 9.1 g. of aniline, 12 cc. of glacial acetic acid and 10 cc. of water was added in portions during one-half hour 8.4 g. of valeryldicyandiamide. The reaction mixture was heated at 72° C. for a total of 2 hours. The clear solution was diluted with water and made alkaline. The precipitated gum-like material which formed was filtered from solution, dissolved in dilute acetic acid and the solution again made alkaline with NaOH. The precipitated N,N'-diphenyl-valeramidine, upon recrystallization from a methanol-water mixture, was found to have a melting point of 90-91° C. and was soluble in dilute HCl and methanol.

EXAMPLE 9

N,N'-diphenyllauramidine

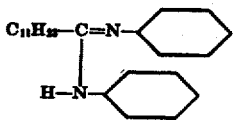

A solution of 10 g. of aniline, 4.3 cc. of concentrated (37%) hydrochloric acid and 30 cc. of methanol was heated to refluxing and 13.3 g. of lauryldicyandiamide added thereto over a period of 40 minutes. After 15 minutes additional heating, the solution became clear and a new precipitate formed. The reaction mixture was diluted to 200 cc. with water and made alkaline with NaOH. N,N'-diphenyllauramidine was precipitated. After recrystallization from a methanol-water mixture, the compound was found to have a melting point of 92-94° C. and was insoluble in cold methanol, but dispersed in a dilute solution of hydrochloric acid.

EXAMPLE 10

N,N'-diphenyl β-ethoxypropionamidine

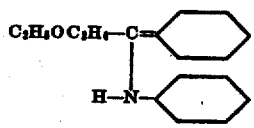

A solution of 115 g. of dicyandiamide, 282 cc. of 60% potassium hydroxide and 400 cc. of acetone was cooled to 0° C. and 142 g. of β-ethoxy-propionylchloride was added thereto in one and one-half hours. The reaction mixture was then diluted with 600 cc. of a 10% solution of sodium chloride and then neutralized with acetic acid. β-Ethoxypropionyldicyandiamide was recovered by filtration.

A solution of 9.3 g. of aniline, 8.5 cc. of concentrated hydrochloric acid, 30 cc. of acetone and 10 cc. of water was heated to refluxing temperature and 11 g. of β-ethoxypropionyldicyandiamide was added slowly thereto. After heating the mixture for 2 hours, the solution was cooled and made alkaline with a solution of NaOH. N,N'-diphenyl β-ethoxypropionamidine was recovered by filtering the alkaline solution. After recrystallization from a methanol-water solution, the product was found to have a melting point of 68-70° C. It was soluble in methanol and dilute hydrochloric acid. Chemical analysis of the product corresponded to N,N'-diphenyl β-ethoxypropionamidine.

EXAMPLE 11

N,N'-di-p-ethoxy-β-ethoxypropionamidine

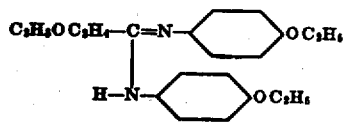

A solution of 13.7 g. of phenetidine, 6 cc. of concentrated hydrochloric acid, 30 cc. of acetone and 10 cc. of water was heated to 65° C. and 14.7 g. of β-ethoxypropiondicyandiamide added thereto. After heating the reaction mixture for 2 hours, it was filtered, diluted with water and made strongly basic with NaOH. The dark colored gummy product which precipitated was slightly impure N,N'-di-p-ethoxy-β-ethoxypropionamidine. The amidine was treated with about 75 cc. of 5% HCl, the liquid decanted and the gum dissolved in water and treated with activated charcoal. The solution was filtered and made alkaline whereupon the amidine was again precipitated. It was crystallized from a methanol-water mixture. It had a melting point of 45-48° C. and was soluble in methanol but insoluble in 5% HCl.

EXAMPLE 12

N,N'-di-p-sulfonamidophenylcaproamidine

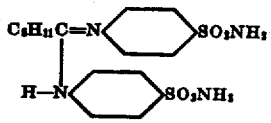

A solution of 17.2 g. of sulfanilamide, 4.25 cc. of concentrated hydrochloric acid, and 40 cc. acetone was heated to refluxing temperature and 11 g. of caproyldicyandiamide added slowly thereto. After heating for 2 hours, the solution was cooled and filtered. The precipitate which was recovered was extracted with 100 cc. of HCl and then recrystallized from about 150 of hot water. The product, N,N'-di-p-sulfonamidophenylcaproamidine had a melting point 190-191° C. It was soluble in hot water, alks. and methanol but was insoluble in cold water acid solutions.

EXAMPLE 13

N,N'-di-p-acetaminophenylcaproamidine

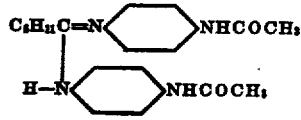

A mixture of 20.3 g. of 89% p-aminoacetanilide, 9.35 cc. of concentrated hydrochloric acid, 100 cc. of acetone and 20 cc. of water was heated to 60° C. To this mixture was added 16.5 g. of caproyldicyandiamide in three portions during the course of an hour. The amine hydrochloride dissolved as the acyl dicyandiamide was added and the final solution was clear. After one more hour of heating N,N'-di-p-acetphenylcaproamidine was recovered by diluting the cooled solution with water and adding excess alkali. The crystalline amidine was dissolved in dilute acid, treated with activated charcoal, filtered and reprecipitated with alkali. A sample of the amidine recrystallized from methanol had a melting point of 105–108° C.

EXAMPLE 14

*N,N'-di-p-sulfophenylcaproamidine*

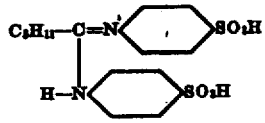

A solution of 20.9 g. of sulfanilic acid dihydrate, 70 cc. of water and 50 cc. of acetone was heated to refluxing and 11 g. of caproyldicyandiamide added in five equal portions thereto during the course of one hour. After two more hours of heating at refluxing temperature, the reaction mixture was cooled, diluted with water and filtered. The crude solid obtained upon filtration was extracted twice with 250 cc. portions of hot water to remove any unreacted sulfanilic acid. The insoluble residue was suspended in 150 cc. of water containing 3 cc. of concentrated hydrochloric acid and the mixture filtered. The insoluble fraction was N,N'-di-p-sulfophenylcaproamidine, which had a melting point of 225–228° C., was very insoluble in hot water and decomposed in alkali.

EXAMPLE 15

*N,N'-di-p-ethoxyphenylvaleramidine*

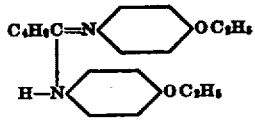

A solution of 13.7 g. of p-phenetidine, 4.5 cc. of concentrated hydrochloric acid, 10 cc. of acetone and 10 cc. of water was heated to refluxing temperature and 9.24 g. of valeryldicyandiamide added slowly thereto. The solution was then diluted with water, cooled and made alkaline. The product, N,N'-di-p-ethoxyphenylvaleramidine was recovered by filtration. After one crystallization from a methanol-water mixture, the product had a melting point of 98–100° C. After three more recrystallizations from methanol-water the melting point was unchanged.

EXAMPLE 16

*N,N'-di-o-tolylvaleramidine*

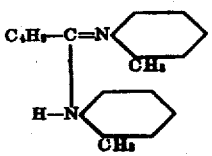

A solution of 10.7 g. of o-toluidine, 4.25 cc. of concentrated hydrochloric acid, 10 cc. of acetone and 10 cc. of water was heated to 75° C. and 13.5 g. valeryldicyandiamide added in three portions over a period of one-half hour. The reaction mixture was then heated for one and one-half hours more and then filtered. N,N'-di-o-tolylvaleramidine was precipitated from solution by the addition of water and excess alkali to the filtrate. This amidine was a gummy material and could not be crystallized from a methanol-water solution.

EXAMPLE 17

*N,N'-di-2,4-dimethylphenylvaleramidine*

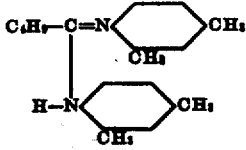

A solution of 18.1 g. of 4-amino-1,3-dimethylbenzene, 8.8 cc. of concentrated hydrochloric acid, 12 cc. of acetone and 12 cc. of water was heated to refluxing temperature and 15.4 g. of valeryldicyandiamide added thereto. After filtering the reaction mixture, diluting with water and adding excess alkali, N,N'-di-2,4-dimethylphenylvaleramidine was precipitated. A purified sample of this product had a melting point of 91–92° C. It was soluble in dilute hydrochloric acid and methanol.

EXAMPLE 18

*N,N',N'',N'''-tetraphenyladipamidine*

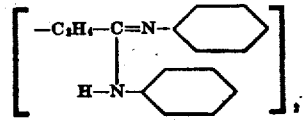

A solution of 23.25 g. of aniline, 12.75 cc. of concentrated hydrochloric acid, 40 cc. of the monoethylether of ethylene glycol and 10 cc. of water was heated on the steam bath and 13.9 g. of adipyl-bis-dicyandiamide was added slowly thereto. After heating for one hour, the crude mixture was diluted with water, acidified and filtered. The filtrate was then made alkaline and N,N',N'',N'''-tetraphenyladipamidine was precipitated. The crude amidine was then recrystallized from hot methanol. The product melted at 128° C.

EXAMPLE 19

*N,N',N'',N'''-tetraphenylsebacamidine*

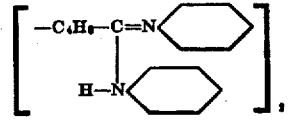

18.6 g. of aniline, 8.5 cc. of concentrated hydrochloric acid, 5 cc. water and 15 cc. of the monoethyl ether of ethylene glycol were heated to refluxing temperature and 18 g. of powdered sebacyldicyandiamide added during a period of 5 minutes. After stirring for one hour, the clear brown solution was diluted to 400 cc. with water, acidified, and filtered. Addition of alkali to the filtrate precipitated a slightly sticky solid. Upon recrystallization twice from methanol, the product was found to be N,N',N'',N'''-tetraphenylsebacamidine. The product had a melting point of 146–148° C., was fairly soluble in methanol and slightly soluble in dilute HCl.

Example 20

N,N'-di-α-naphthylcaproamidine

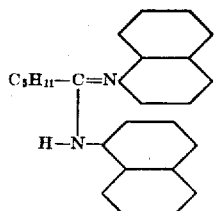

14.5 g. of caproyldicyandiamide was added in portions to a solution of 16.5 g. of α-naphthylamine, 4.7 cc. of concentrated hydrochloric acid and 40 cc. of acetone. After heating for 2 hours at refluxing temperature, the clear solution was diluted with water and made alkaline. A precipitate of N,N'-di-α-naphthylcaproamidine was obtained. The gummy product could not be crystallized from common solvents.

Example 21

N,N'-diphenylbenzamidine

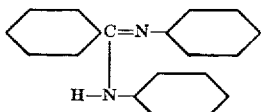

A mixture of 18.8 g. of benzoyldicyandiamide, 9.3 g. of aniline and 8.5 cc. of concentrated hydrochloric acid were heated to an exothermic reaction on a steam bath and then for 15 minutes more. The reaction mixture contained benzoguanide and N,N'-diphenylbenzamidine. The latter product was isolated by adding to the mixture, water and NaOH. The benzoguanide dissolved in this solution leaving the amidine as an insoluble residue. The solution was filtered and N,N'-diphenylbenzamidine recovered. Upon recrystallization of the latter from methanol-water solution, it was found to have a melting point within the range 144–148° C. Chemical analysis of the product checked closely with the theoretical values for N,N'-diphenylbenzamidine.

We claim:

1. A method of preparing N,N'-diarylamidines which comprises the step of mixing a primary aromatic amine, a carboxylic acyl dicyandiamide and an acid having a dissociation constant of at least $1 \times 10^{-5}$.

2. A method of preparing N,N'-diarylamidines which comprises the steps of mixing a primary aromatic amine, a carboxylic acyl dicyandiamide and an acid having a dissociation constant of at least $1 \times 10^{-5}$, and heating the mixture at temperatures within the range 50° C. to 110° C. until an N,N'-diarylamidine is formed.

3. A method of preparing N,N'-diarylamidines which comprises the steps of mixing a primary aromatic amine, a carboxylic acyl dicyandiamide and an acid having a dissociation constant of at least $1 \times 15^{-5}$, and heating the reaction mixture at elevated temperatures for a period of time of from about 15 minutes to 3 hours.

4. A method of preparing N,N'-diarylamidines which comprises the steps of mixing a primary aromatic amine, a carboxylic acyl dicyandiamide, an acid having a dissociation constant of at least $1 \times 10^{-5}$, and an inert solvent and heating the mixture at temperatures within the range of 50° C to 110° C. for a period of time of from about 15 minutes to 3 hours.

5. A method of preparing N,N'-diarylamidines which comprises the steps of mixing a primary aromatic amine with an aliphatic carboxylic acyl dicyandiamide, an acid having a dissociation constant of $1 \times 10^{-5}$, and an inert solvent and heating the reaction mixture at an elevated temperature until an N,N'-diarylamidine is formed.

6. A method of preparing N,N'-diarylamidines which comprises the steps of mixing a primary aromatic amine with an aromatic carboxylic acyl dicyandiamide, an acid, having a dissociation constant of $1 \times 10^{-5}$, and an inert solvent and heating the reaction mixture at an elevated temperature until an N,N'-diarylamidine is formed.

7. A method of preparing N,N'-diarylamidines which comprises the steps of mixing in a solvent a carboxylic acyl dicyandiamide and an acid salt of a primary aromatic amine and heating the mixture until an N,N'-diarylamidine is formed.

JACK T. THURSTON.
DANIEL E. NAGY.

---

Certificate of Correction

Patent No. 2,364,593.   December 5, 1944.

JACK T. THURSTON ET AL.

It is hereby certified that error appears in the printed specification of the above numbered patent requiring correction as follows: Page 5, second column, line 16, claim 3, for "$1 \times 15^{-5}$" read $1 \times 10^{-5}$; and that the said Letters Patent should be read with this correction therein that the same may conform to the record of the case in the Patent Office.

Signed and sealed this 6th day of March, A. D. 1945.

[SEAL]

LESLIE FRAZER,
*Acting Commissioner of Patents.*

Example 20

*N,N'-di-α-naphthylcaproamidine*

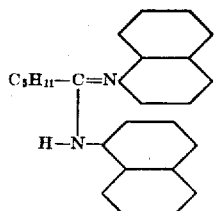

14.5 g. of caproyldicyandiamide was added in portions to a solution of 16.5 g. of α-naphthylamine, 4.7 cc. of concentrated hydrochloric acid and 40 cc. of acetone. After heating for 2 hours at refluxing temperature, the clear solution was diluted with water and made alkaline. A precipitate of N,N'-di-α-naphthylcaproamidine was obtained. The gummy product could not be crystallized from common solvents.

Example 21

*N,N'-diphenylbenzamidine*

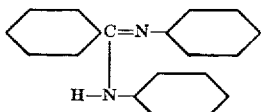

A mixture of 18.8 g. of benzoyldicyandiamide, 9.3 g. of aniline and 8.5 cc. of concentrated hydrochloric acid were heated to an exothermic reaction on a steam bath and then for 15 minutes more. The reaction mixture contained benzoguanide and N,N'-diphenylbenzamidine. The latter product was isolated by adding to the mixture, water and NaOH. The benzoguanide dissolved in this solution leaving the amidine as an insoluble residue. The solution was filtered and N,N'-diphenylbenzamidine recovered. Upon recrystallization of the latter from methanol-water solution, it was found to have a melting point within the range 144–148° C. Chemical analysis of the product checked closely with the theoretical values for N,N'-diphenylbenzamidine.

We claim:

1. A method of preparing N,N'-diarylamidines which comprises the step of mixing a primary aromatic amine, a carboxylic acyl dicyandiamide and an acid having a dissociation constant of at least $1 \times 10^{-5}$.

2. A method of preparing N,N'-diarylamidines which comprises the steps of mixing a primary aromatic amine, a carboxylic acyl dicyandiamide and an acid having a dissociation constant of at least $1 \times 10^{-5}$, and heating the mixture at temperatures within the range 50° C. to 110° C. until an N,N'-diarylamidine is formed.

3. A method of preparing N,N'-diarylamidines which comprises the steps of mixing a primary aromatic amine, a carboxylic acyl dicyandiamide and an acid having a dissociation constant of at least $1 \times 15^{-5}$, and heating the reaction mixture at elevated temperatures for a period of time of from about 15 minutes to 3 hours.

4. A method of preparing N,N'-diarylamidines which comprises the steps of mixing a primary aromatic amine, a carboxylic acyl dicyandiamide, an acid having a dissociation constant of at least $1 \times 10^{-5}$, and an insert solvent and heating the mixture at temperatures within the range of 50° C to 110° C. for a period of time of from about 15 minutes to 3 hours.

5. A method of preparing N,N'-diarylamidines which comprises the steps of mixing a primary aromatic amine with an aliphatic carboxylic acyl dicyandiamide, an acid having a dissociation constant of $1 \times 10^{-5}$, and an inert solvent and heating the reaction mixture at an elevated temperature until an N,N'-diarylamidine is formed.

6. A method of preparing N,N'-diarylamidines which comprises the steps of mixing a primary aromatic amine with an aromatic carboxylic acyl dicyandiamide, an acid, having a dissociation constant of $1 \times 10^{-5}$, and an inert solvent and heating the reaction mixture at an elevated temperature until an N,N'-diarylamidine is formed.

7. A method of preparing N,N'-diarylamidines which comprises the steps of mixing in a solvent a carboxylic acyl dicyandiamide and an acid salt of a primary aromatic amine and heating the mixture until an N,N'-diarylamidine is formed.

JACK T. THURSTON.
DANIEL E. NAGY.

---

Certificate of Correction

Patent No. 2,364,593.      December 5, 1944.

JACK T. THURSTON ET AL.

It is hereby certified that error appears in the printed specification of the above numbered patent requiring correction as follows: Page 5, second column, line 16, claim 3, for "$1 \times 15^{-5}$" read $1 \times 10^{-5}$; and that the said Letters Patent should be read with this correction therein that the same may conform to the record of the case in the Patent Office.

Signed and sealed this 6th day of March, A. D. 1945.

[SEAL]

LESLIE FRAZER,
*Acting Commissioner of Patents.*